(12) United States Patent
Choiniere

(10) Patent No.: US 10,797,461 B2
(45) Date of Patent: Oct. 6, 2020

(54) NON-LINEAR OPTICAL MAPPING OF SAL SEEKER DETECTOR ARRAY FOR REMOVING APPLIED LENS DISTORTION FROM INCOMING SIGNAL

(71) Applicant: BAE SYSTEMS Information and Electronic Systems Integration Inc., Nashua, NH (US)

(72) Inventor: Michael J. Choiniere, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 250 days.

(21) Appl. No.: 16/163,738

(22) Filed: Oct. 18, 2018

(65) Prior Publication Data

US 2020/0127433 A1   Apr. 23, 2020

(51) Int. Cl.
 *G02B 27/09* (2006.01)
 *H01S 3/00* (2006.01)
 *G02B 27/00* (2006.01)

(52) U.S. Cl.
 CPC ........ *H01S 3/0085* (2013.01); *G02B 27/0037* (2013.01); *G02B 27/0955* (2013.01)

(58) Field of Classification Search
 CPC ................ G02B 26/06; G02B 27/0037; G02B 27/0955; H01S 3/0085; H04N 1/047; H04N 2201/043

USPC .......................................... 250/203.6, 214 R
See application file for complete search history.

(56) References Cited

U.S. PATENT DOCUMENTS

| 6,437,321 B1* | 8/2002 | Greninger ............. G02B 26/06 250/216 |
| 9,930,272 B2 | 3/2018 | El-Ghoroury et al. |
| 2005/0058352 A1 | 3/2005 | Deliwala |
| 2008/0316609 A1 | 12/2008 | Robinson |
| 2010/0208032 A1 | 8/2010 | Kweon |

OTHER PUBLICATIONS

International Search Report, PCT/US19/55573, dated Jan. 8, 2020, 8 pages.

* cited by examiner

*Primary Examiner* — Que Tan Le
(74) *Attorney, Agent, or Firm* — KPIP Law, PLLC

(57) ABSTRACT

The system and method non-linear optical mapping of a detector array to expand the field of view. Outer edges of the sensor array having lower resolution spatial resolution in exchange for an expanded field of view. A lens is used to distort incoming signals to provide the expanded field of view and a processor is used to remove the distortion to provide the actual spatial angles for the incoming signals suing a look up table or an algorithm. The lens may create radial or linear distortion.

12 Claims, 3 Drawing Sheets receiving incoming laser signals via a sensor array, wherein the sensor array comprises a plurality of pixels (20)

distorting the incoming laser signals with at least one lens, wherein outer edges of the sensor array have a lower resolution compared to an inner portion of the sensor array thus providing for an expanded field of view for the sensor array (22)

energy associated with each of the incoming laser signals within the expanded field of view of the sensor array (24)

detecting the subset of energized pixels via the sensor array (26)

communicating to a processor the subset of detected energized pixels (28)

determining actual spatial angles for each of the incoming laser signals by removing the distortion using an algorithm or look up table (30)

NON-LINEAR OPTICAL MAPPING OF SAL SEEKER DETECTOR ARRAY FOR REMOVING APPLIED LENS DISTORTION FROM INCOMING SIGNAL

FIELD OF THE DISCLOSURE

The present disclosure relates to detector arrays and more particularly to using a non-linear mapping technique to extend the field of view coverage of a semi-active laser (SAL) seeker or other optical device.

BACKGROUND OF THE DISCLOSURE

The typical SAL seeker approach uses a linear mapping of angle space to linear space on the detector array. In that situation, each pixel represents an instantaneous Field of View (iFOV) that is simply the FOV divided by the number of pixels within the array. This forces the design trade-off between maximizing the FOV at the expense of spatial resolution.

Wherefore it is an object of the present disclosure to overcome the above-mentioned shortcomings and drawbacks associated with the conventional detector arrays.

SUMMARY OF THE DISCLOSURE

In the case of a SAL seeker, resolution is typically needed in the center of the FOV, but not at the outer regions of the FOV. By applying a nonlinear distortion to the optics, according to the principles of the present disclosure the outer regions can relax the iFOV by 1.5 to 3× and increase the overall FOV without sacrificing the needed resolution in the center, such as used in terminal guidance. Optical systems, tracking systems, seekers, and the like, benefit from nonlinear FOV where in a sub-region high fidelity spatial resolution is required to perform an operation and in other portions of the FOV, extended spatial range is more important than spatial resolution.

One aspect of the present disclosure is a system comprising of a detector array and a lens set that provides increasing radial scaler distortion as the energy approaches the edges of the Field of View (FOV), providing an increased FOV at the expense of spatial resolution. In the case of a seeker, the outer edges of the FOV cover larger spatial areas but with reduced resolution. When the seeker centers the target within the FOV it provides enhanced spatial resolution as would be needed for terminal engagement with a target, for example.

In one embodiment of the system the distortion is linear in the horizontal direction to provide increased azimuth coverage with reduced spatial resolution. In this case, elevation is held constant and the azimuth provides for the varying spatial resolution. This could be applied to a ground-based tracking system where azimuth cover could extend to about 180 degrees while maintaining elevation to about 90 degrees.

One aspect of the present disclosure is a method of non-linear optical mapping of a detector array, comprising: receiving incoming laser signals via a sensor array, wherein the sensor array comprises a plurality of pixels; distorting the incoming laser signals with at least one lens, wherein outer edges of the sensor array have a lower resolution compared to an inner portion of the sensor array thus providing for an expanded field of view for the sensor array; energizing a subset of the plurality of pixels on the sensor array corresponding to a location of an energy associated with each of the incoming laser signals within the expanded field of view of the sensor array; detecting the subset of energized pixels via the sensor array; communicating to a processor the subset of detected energized pixels; determining actual spatial angles for each of the incoming laser signals by removing the distortion using an algorithm or look up table.

One embodiment of the method of non-linear optical mapping of a detector array is wherein the distortion is linear in a horizontal direction to provide increased azimuth coverage with reduced spatial resolution. In some cases, elevation is held constant and the azimuth provides for varying spatial resolution.

Another embodiment of the method of non-linear optical mapping of a detector array is wherein the method applied to a ground-based tracking system such that azimuth extends to about 180 degrees and elevation extends to about 90 degrees. In some cases, the distortion is radially oriented about the sensor array.

Yet another embodiment of the method of non-linear optical mapping of a detector array is wherein the lens comprises higher order distortion of complex injection molded optics to provide multiple spatial zones over the field of view of the sensor array.

Another aspect of the present disclosure is a system for non-linear optical mapping of a detector array, comprising a sensor array configured to detect incoming signals; a lens applying distortion to the incoming signals; and a processor configured to process the incoming signals detected by the sensor array and remove the lens distortion via an algorithm or look up table to produce a pixel by pixel correction.

One embodiment of the system for non-linear optical mapping of a detector array is wherein the distortion is linear in a horizontal direction to provide increased azimuth coverage with reduced spatial resolution. In some cases, elevation is held constant and the azimuth provides for varying spatial resolution.

Another embodiment of the system for non-linear optical mapping of a detector array is wherein the system is applied to a ground-based tracking system such that azimuth extends to about 180 degrees and elevation extends to about 90 degrees. In certain embodiments, the distortion is radially oriented about the sensor array.

Yet another embodiment of the system for non-linear optical mapping of a detector array is wherein the lens comprises higher order distortion of complex injection molded optics to provide multiple spatial zones over the field of view of the sensor array.

These aspects of the disclosure are not meant to be exclusive and other features, aspects, and advantages of the present disclosure will be readily apparent to those of ordinary skill in the art when read in conjunction with the following description, appended claims, and accompanying drawings.

BRIEF DESCRIPTION OF THE DRAWINGS

The foregoing and other objects, features, and advantages of the disclosure will be apparent from the following description of particular embodiments of the disclosure, as illustrated in the accompanying drawings in which like reference characters refer to the same parts throughout the different views. The drawings are not necessarily to scale, emphasis instead being placed upon illustrating the principles of the disclosure.

DETAILED DESCRIPTION OF THE DISCLOSURE

Figure 1:
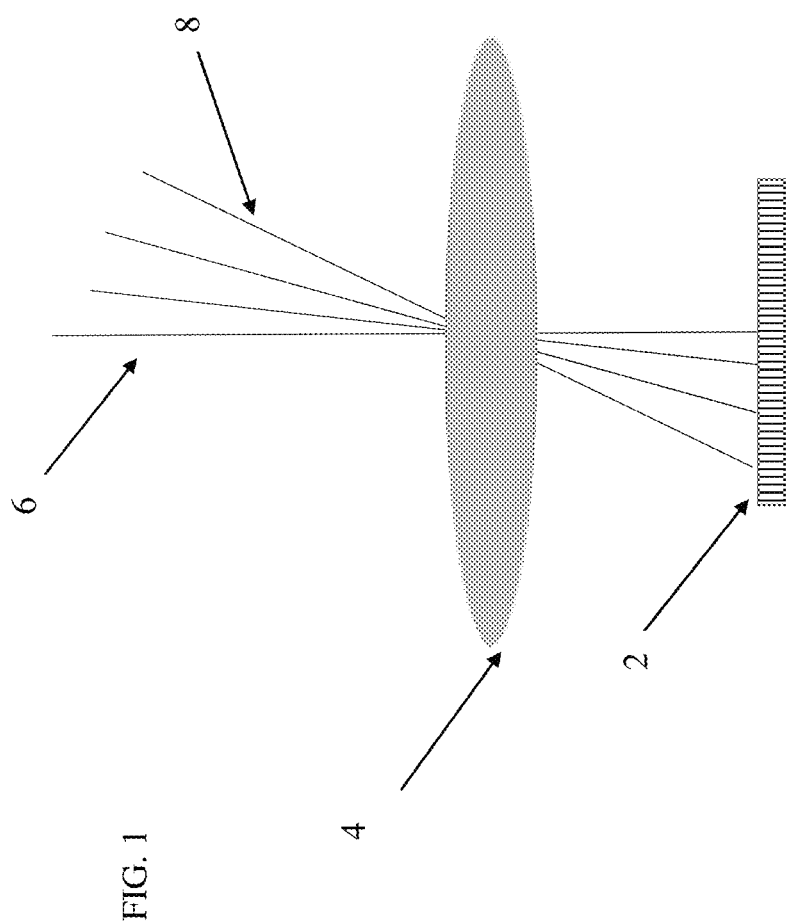
FIG. 1 illustrates one embodiment of the system of the present disclosure.

One embodiment of the system of the present disclosure could be used for any semi-active laser (SAL) seeker weapon or imager where higher resolution/eye acuity is needed when looking forward and less resolution is needed around the edges of the field of view (FOV) for peripheral vision queuing. In one embodiment, the system allows customization of the FOV accuracy through optical design. By modifying the distortion performance of the lens design, the angular performance of the system can be traded for extended FOV coverage. The trade can be non-linear, thus preserving high angle accuracy in the center of the FOV while rolling off toward the edge of the FOV.

In one embodiment, a SAL seeker's performance is optimized between the FOV and the angle accuracy as function of the FOV. Using lens distortion, one can vary the detector array's instantaneous field of view (ifov) over the FOV such that there is a higher angular accuracy in the center zone of the FOV and a queuing area toward the edge of the FOV providing lower angle accuracy for a larger overall FOV. In one example, in a 400 by 400 array the inner 200 by 200 pixels covers only 15 degrees and the outer 200 pixels cover an additional 45 degrees. In this example, the ifov is 3× larger than that of the center region.

Systems using larger or smaller arrays can benefit from the same approach thus allowing single aperture optics to provide dual purposes with varying spatial resolution. Utilizing an aspheric lens, both molded glass and higher complexity injection molded plastic lens components, the array can be divided into sub regions of varying spatial resolution. The processing electronics retrieving the sensor's image/SAL can transform the row and column position on the array into actual angle space to preform seeker/tracking functions for a guidance system, or the like. The process transform is simply the inverse of the lens distortion.

The application of these techniques can be applied to laser detection in either designator (precursor to incoming designated weapon) or LRF (generation of grid position for use in targeting). In either case detection of the laser azimuth and elevation angular position is crucial for defensive response. In one embodiment of the present disclosure, 360° coverage is possible with 2 to 4 sensors. In other embodiments the ability to micro scan/track the laser energy with additional optics (e.g., a Risley prism) the center of the array resolution can be moved where the initial detection occurred for high fidelity angle resolution.

Each of these potential systems balances the need for FOV and iFOV by shaping the optical system to provide the optical distortion in the regions of array. The optical distortion is then characterized for post processing. The sensor array can be any band, visible, NIR, SWIR, MWIR and LWIR depending on the application needs. The lens can be highly aspheric, made from molded glass or injection molded plastics depending on the band and the application environmental conditions.

In certain embodiments, the processor can be simple or complex depending on the clutter requirements, but a simple system processes the pulses streamed and the remaps the row and column pixel position in Azimuth, Elevation angles with the optical distortion removed. The distortion can be characterized by one or more algorithms or look up tables from a calibration process. This approach simplifies cost and complexity since a 200 by 200 pixel can achieve the same performance as a 400 by 400 pixel array. In one embodiment, a 200 pixel array is divided into a 100 pixel center portion and an outer 50 pixel portion each side of the central portion. In one example, the outer portion is distorted by 3:1, with a net effect of 100+3(50+50)=400 pixels. This ripples through the system since the total pixel count is reduce from 16,000 to 4,000, thus reducing processing and size, weight and power.

Referring to FIG. 1, one embodiment of the system of the present disclosure is shown. More specifically, the instantaneous Field of View (iFOV) of a pixel 2, changes from 6 to 8 as the lens 4 distorts from the center to the edge of the FOV.

Figure 2:
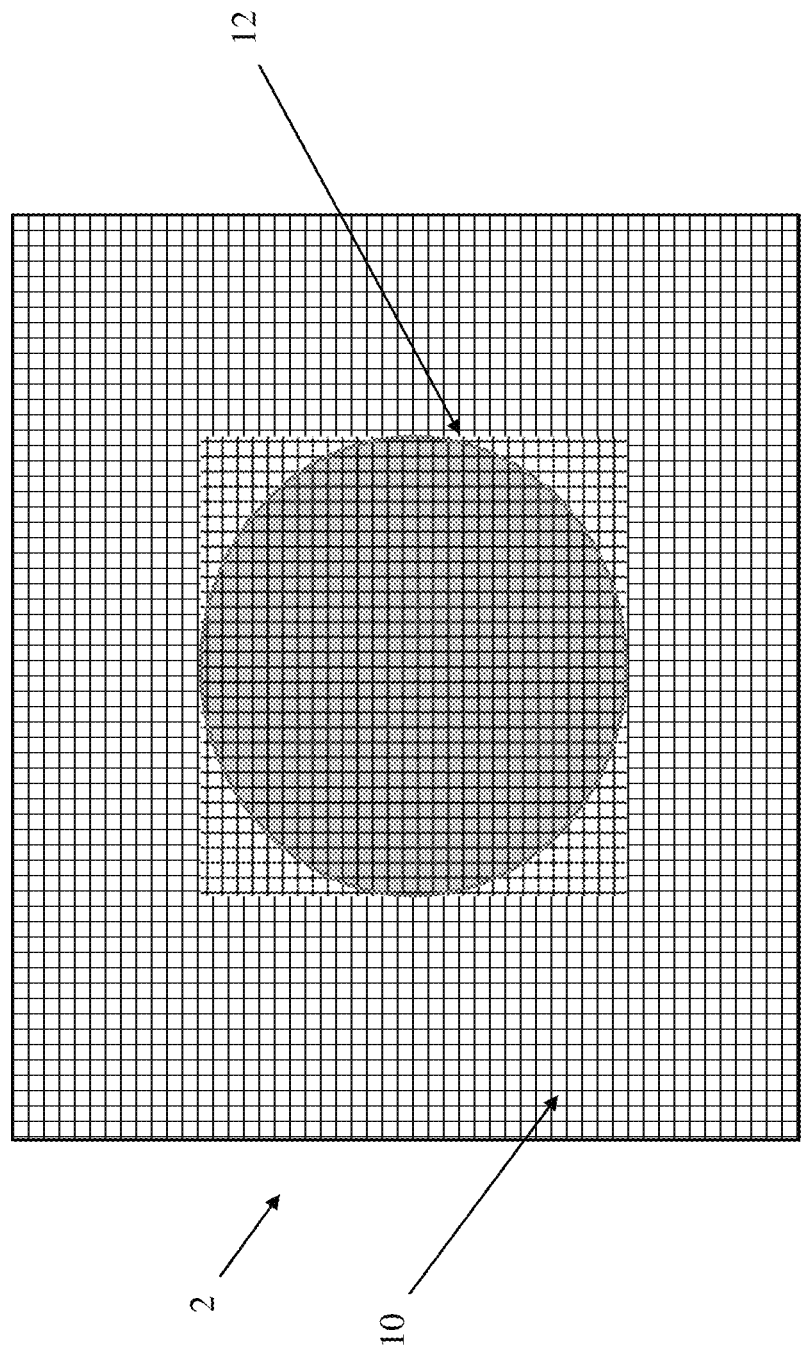
FIG. 2 illustrates one embodiment of the array according to the principles of the present disclosure.

Referring to FIG. 2, one embodiment of the array according to the principles of the present disclosure is shown. More specifically, the array 2 is shown being irradiated by a radially distorted lens proving a higher spatial zone 12 and a lower spatial zone 10. In one embodiment, the transition from zone 10 and 12 can be highly nonlinear. In another embodiment, the transition from zone 10 and 12 can be linear depending on the lens design.

Figure 3:
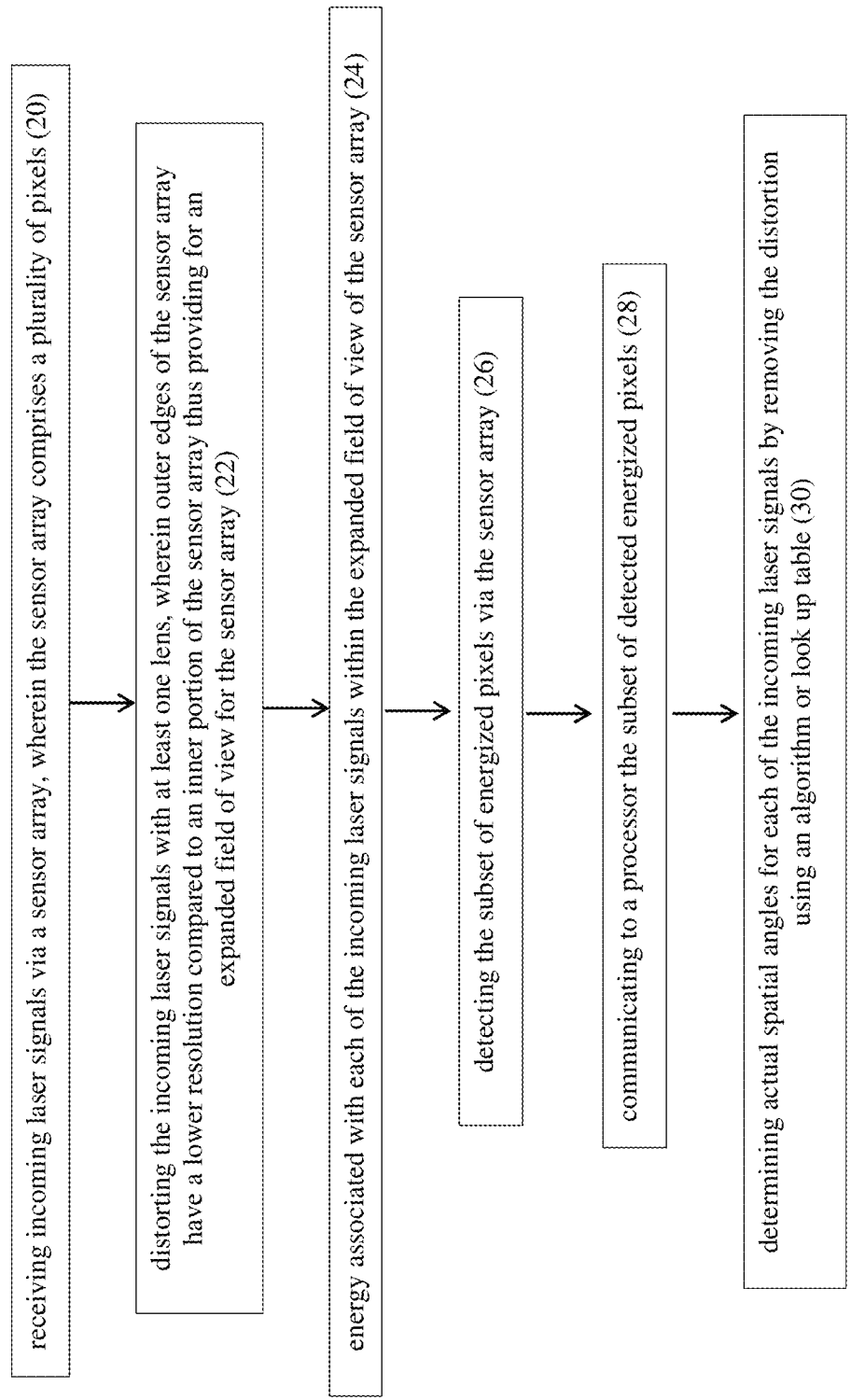
FIG. 3 shows one embodiment of a method according to the principles of the present disclosure.

Referring to FIG. 3, one embodiment of a method according to the principles of the present disclosure is shown. More specifically, in one method of non-linear optical mapping of a detector array, incoming laser signals are received via a sensor array, wherein the sensor array comprises a plurality of pixels (20). The incoming laser signals are distorted with at least one lens, wherein outer edges of the sensor array have a lower resolution compared to an inner portion of the sensor array thus providing for an expanded field of view for the sensor array (22). A subset of the plurality of pixels on the sensor array are energized corresponding to a location of an energy associated with each of the incoming laser signals within the expanded field of view of the sensor array (24). The subset of energized pixels is then detected via the sensor array (26). The subset of detected energized pixels are communicated to a processor (28) and actual spatial angles are determined for each of the incoming laser signals by removing the distortion using an algorithm or look up table (30).

The computer readable medium as described herein can be a data storage device, or unit such as a magnetic disk, magneto-optical disk, an optical disk, or a flash drive. Further, it will be appreciated that the term "memory" herein is intended to include various types of suitable data storage media, whether permanent or temporary, such as transitory electronic memories, non-transitory computer-readable medium and/or computer-writable medium.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

The foregoing description of the embodiments of the present disclosure has been presented for the purposes of illustration and description. It is not intended to be exhaustive or to limit the present disclosure to the precise form disclosed. Many modifications and variations are possible in light of this disclosure. It is intended that the scope of the present disclosure be limited not by this detailed description, but rather by the claims appended hereto.

A number of implementations have been described. Nevertheless, it will be understood that various modifications may be made without departing from the scope of the disclosure. Although operations are depicted in the drawings in a particular order, this should not be understood as requiring that such operations be performed in the particular order shown or in sequential order, or that all illustrated operations be performed, to achieve desirable results.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed:

1. A method of non-linear optical mapping of a detector array, comprising:
   receiving incoming laser signals via a sensor array, wherein the sensor array comprises a plurality of pixels;
   distorting the incoming laser signals with at least one lens, wherein outer edges of the sensor array have a lower resolution compared to an inner portion of the sensor array thus providing for an expanded field of view for the sensor array;
   energizing a subset of the plurality of pixels on the sensor array corresponding to a location of an energy associated with each of the incoming laser signals within the expanded field of view of the sensor array;
   detecting the subset of energized pixels via the sensor array;
   communicating to a processor the subset of detected energized pixels;
   determining actual spatial angles for each of the incoming laser signals by removing the distortion using an algorithm or look up table.

2. The method of non-linear optical mapping of a detector array according to claim 1, wherein the distortion is linear in a horizontal direction to provide increased azimuth coverage with reduced spatial resolution.

3. The method of non-linear optical mapping of a detector array according to claim 2, wherein elevation is held constant and the azimuth provides for varying spatial resolution.

4. The method of non-linear optical mapping of a detector array according to claim 1, wherein the method applied to a ground-based tracking system such that azimuth extends to about 180 degrees and elevation extends to about 90 degrees.

5. The method of non-linear optical mapping of a detector array according to claim 1, wherein the distortion is radially oriented about the sensor array.

6. The method of non-linear optical mapping of a detector array according to claim 1, wherein the lens comprises higher order distortion of complex injection molded optics to provide multiple spatial zones over the field of view of the sensor array.

7. A system for non-linear optical mapping of a detector array, comprising
   a sensor array configured to detect incoming signals;
   a lens applying distortion to the incoming signals; and
   a processor configured to process the incoming signals detected by the sensor array and remove the lens distortion via an algorithm or look up table to produce a pixel by pixel correction.

8. The system for non-linear optical mapping of a detector array according to claim 7, wherein the distortion is linear in a horizontal direction to provide increased azimuth coverage with reduced spatial resolution.

9. The system for non-linear optical mapping of a detector array according to claim 8, wherein elevation is held constant and the azimuth provides for varying spatial resolution.

10. The system for non-linear optical mapping of a detector array according to claim 7, wherein the system is applied to a ground-based tracking system such that azimuth extends to about 180 degrees and elevation extends to about 90 degrees.

11. The system for non-linear optical mapping of a detector array according to claim 7, wherein the distortion is radially oriented about the sensor array.

12. The system for non-linear optical mapping of a detector array according to claim 7, wherein the lens comprises higher order distortion of complex injection molded optics to provide multiple spatial zones over the field of view of the sensor array.

* * * * *